S. WEISER.
TIRE BANDAGE.
APPLICATION FILED APR. 14, 1919.
1,313,143. Patented Aug. 12, 1919.
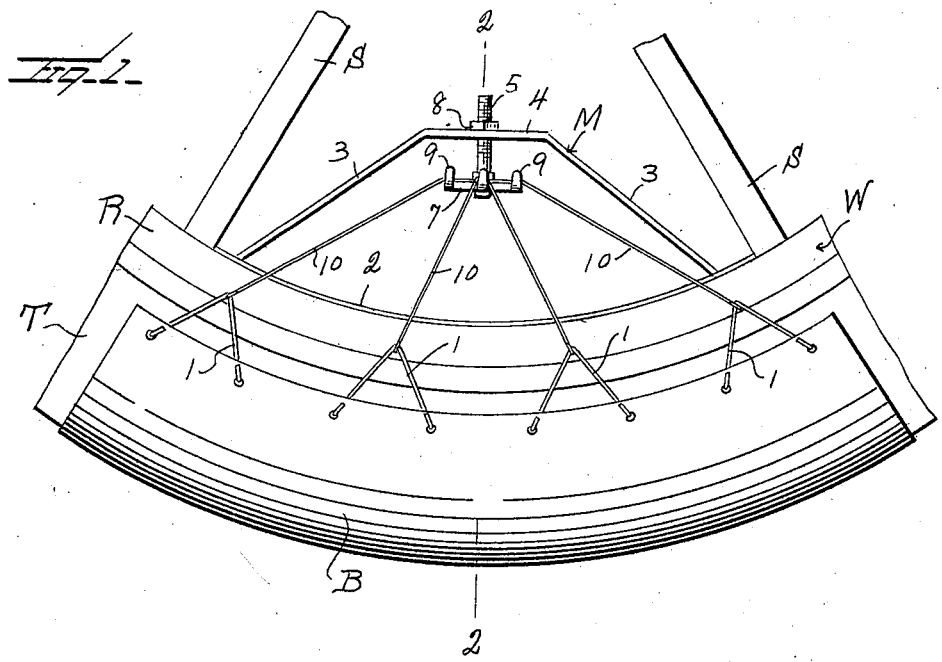
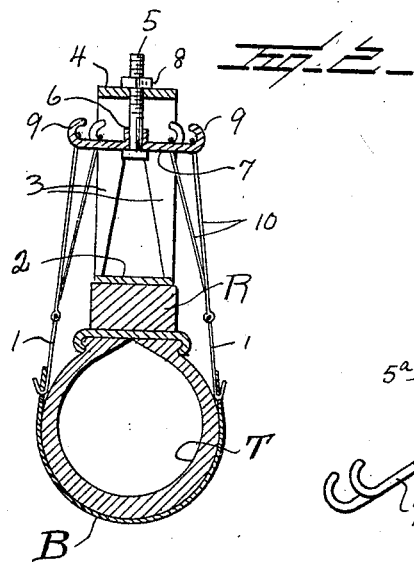
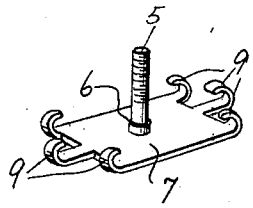
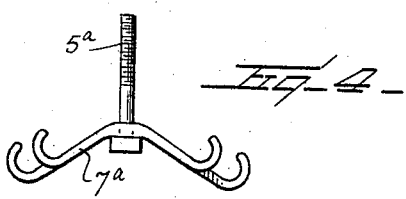
Inventor
S. Weiser
By Watson E. Coleman
Attorney

UNITED STATES PATENT OFFICE.

SIMON WEISER, OF HOUSTON, TEXAS.

TIRE-BANDAGE.

1,313,143.  Specification of Letters Patent.  Patented Aug. 12, 1919.

Application filed April 14, 1919. Serial No. 290,010.

*To all whom it may concern:*

Be it known that I, SIMON WEISER, a citizen of the United States, residing at Houston, in the county of Harris and State of Texas, have invented certain new and useful Improvements in Tire - Bandages, of which the following is a specification, reference being had to the accompanying drawings.

This invention relates to certain improvements in tire bandages, and it is an object of the invention to provide novel and improved means whereby a bandage may be maintained effectually in applied position.

It is also an object of the invention to provide a retaining means for a bandage which comprises a member adapted to engage the inner face of the rim of a wheel body and positioned between adjacent spokes of such body, together with means coacting with said member to hold effectually a bandage in applied position upon a tire.

The invention consists in the details of construction and in the combination and arrangement of the several parts of my improved bandage whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating a bandage constructed in accordance with an embodiment of my invention and in applied position, the coacting wheel body being shown in fragment.

Fig. 2 is a sectional view taken substantially on the line 2—2 of Fig. 1.

Fig. 3 is a view in perspective of the movable plate as herein included, and

Fig. 4 is a view in elevation illustrating a movable plate constructed in accordance with a modified form of my invention.

As disclosed in the accompanying drawings, W denotes a wheel body including the spokes S, the rim R, and an inflatable tire T arranged upon said rim R.

B denotes a bandage or shoe of any ordinary or preferred construction and which is adapted to be applied over the tire T to effect a temporary repair of a blow-out or the like. The marginal portions of the bandage B have engaged therewith the hook members 1 each substantially V-shape in form with its apex inwardly directed.

M denotes a truss member having an outer segmental or rim part 2 adapted to engage the inner face of the rim R between adjacent spokes and the opposite end portions of said part 2 are provided with the inwardly converging arms 3 connected at their inner or converging ends by the plate 4 preferably integral therewith.

Directed through the central portion of the plate 4 is a threaded shank 5 having its outer end portion in connection, as at 6, with a second plate 7 and which plate is arranged between the arm 3 and between the rim or segmental part 2 and the plate 4. In threaded engagement with the portion of the shank 5 inward of the plate 4 is a nut 8 or the like which contacts with the inner face of the plate to limit the outward movement of the shank 5 and which also operates to move said shank inwardly upon requisite rotation of the nut 8 or the like around the shank 5.

The plate 7 is preferably elongated with its major axis disposed substantially transversely of the wheel body W and the opposite end portions of said plate are provided with a plurality of transversely spaced hook members 9, preferably three in number, and with each of which is engaged the intermediate portion of a flexible member 10. The extremities of the members 10 are suitably engaged with the hooks 1 hereinbefore referred to so that upon requisite inward movement being imparted to the plate 7, the bandage or shoe B will be effectively maintained in applied position upon the tire T.

While the plate 7 in Figs. 1, 2 and 3 is disclosed as substantially flat, I find it of advantage at times to have the plate 7ª, as illustrated in Fig. 4, arranged longitudinally substantially in the form of a V with the apex portion upwardly directed and with the shank 5ª disposed upwardly through said apex portion.

In view of the foregoing, it is believed to be clearly apparent that with my improved fastening means, the bandage or shoe B may be applied or removed with convenience and facility.

From the foregoing description, it is thought to be obvious that a bandage constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a tire bandage, a member adapted to engage the inner face of a wheel rim, inwardly directed arms carried by said member, a plate connecting said arms, a member directed through the plate, a second plate carried by said last-named member and positioned between the first-named plate and the member adapted for contact with the rim of the wheel, means for connecting said second plate and the marginal portions of the bandage, and means coacting with the second member and the first-named plate for imparting endwise movement to said second member.

2. In combination with a tire bandage, a member adapted to engage the inner face of a wheel rim, inwardly directed arms carried by said member, a plate connecting said arms, a member directed through the plate, a second plate carried by said last-named member and positioned between the first-named plate and the member adapted for contact with the rim of the wheel, means for connecting said second plate and the marginal portions of the bandage, and means coacting with the second member and the first-named plate for imparting endwise movement to said second member, opposite end portions of the second-named plate being provided with hooks with which the means connecting said second-named plate and the bandage are engaged.

3. In combination with a tire bandage, a member adapted to engage the inner face of a wheel rim, inwardly directed arms carried by said member, a plate connecting said arms, a member directed through the plate, a second plate carried by said last-named member and positioned between the first-named plate and the member adapted for contact with the rim of the wheel, means for connecting said second plate and the marginal portions of the bandage, and means coacting with the second member and the first-named plate for imparting endwise movement to said second member, the arms of the first-named member converging and the first-named plate being arranged at the converging end portions of said arms.

4. In combination with a tire bandage, a member adapted to engage the inner face of a wheel rim, inwardly directed arms carried by said member, a plate connecting said arms, a member directed through the plate, a second plate carried by said last-named member and positioned between the first-named plate and the member adapted for contact with the rim of the wheel, means for connecting said second plate and the marginal portions of the bandage, and means coacting with the second member and the first-named plate for imparting endwise movement to said second member, said first-named member being elongated and extending circumferentially of the rim when in applied position.

In testimony whereof I hereunto affix my signature in the presence of two witnesses.

SIMON WEISER.

Witnesses:
L. ZAINFELD,
J. G. SEIBOLD.

Copies of this patent may be obtained for five cents each, by addressing the "Commissioner of Patents. Washington, D. C."